United States Patent
Jaldén et al.

(10) Patent No.: US 10,728,822 B2
(45) Date of Patent: Jul. 28, 2020

(54) INITIATING BLIND HANDOVER

(71) Applicant: Telefonaktiebolaget LM Ericsson (publ), Stockholm (SE)

(72) Inventors: Niklas Jaldén, Enköping (SE); Paul Stjernholm, Lidingö (SE); Peter von Butovitsch, Djursholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/558,867

(22) PCT Filed: Mar. 17, 2015

(86) PCT No.: PCT/EP2015/055551
§ 371 (c)(1),
(2) Date: Sep. 15, 2017

(87) PCT Pub. No.: WO2016/146172
PCT Pub. Date: Sep. 22, 2016

(65) Prior Publication Data
US 2018/0070279 A1 Mar. 8, 2018

(51) Int. Cl.
*H04W 36/30* (2009.01)
*H04W 36/24* (2009.01)
(Continued)

(52) U.S. Cl.
CPC ........... *H04W 36/30* (2013.01); *H04W 36/24* (2013.01); *H04W 36/14* (2013.01); *H04W 36/36* (2013.01)

(58) Field of Classification Search
CPC ..... H04W 36/14; H04W 36/24; H04W 36/30; H04W 36/36
See application file for complete search history.

(56) References Cited

U.S. PATENT DOCUMENTS 5,886,988 A * 3/1999 Yun ...................... H04B 7/0408
370/329
7,224,972 B2 * 5/2007 Pischella ........... H04W 36/0085
455/436
(Continued)

FOREIGN PATENT DOCUMENTS

EP 2 369 869 A1 9/2011
WO 2007022005 A2 2/2007
(Continued)

OTHER PUBLICATIONS

International Search Report and Written Opinion issued in International Application No. PCT/EP2015/055551, dated Sep. 8, 2015, 10 pages.

*Primary Examiner* — Marcus Smith
(74) *Attorney, Agent, or Firm* — Patent Portfolio Builders, PLLC

(57) ABSTRACT

The disclosure relates to a method (20) for initiating a blind handover of a terminal (2) in a wireless communications system (1). The terminal (2) is served by a first cell using a first frequency band and a first radio access technology, wherein the wireless communications system (1) employs a method for dynamically changing coverage in at least one of the first cell and a second cell. The method (20) comprises estimating (21) the coverage in the second cell, wherein at least one of a second frequency band and a second radio access technology of the second cell may differ from the first frequency band and the first radio access technology, an initiating (22) the blind handover for the terminal (2) to the second cell only if the estimated coverage in the second cell meets a criterion. A wireless communications system (1), computer programs and computer program products are also provided.

21 Claims, 3 Drawing Sheets

(51) Int. Cl.
*H04W 36/14* (2009.01)
*H04W 36/36* (2009.01)

(56) References Cited

U.S. PATENT DOCUMENTS

| | | | | |
|---|---|---|---|---|
| 10,117,144 B2* | 10/2018 | Sandhu | ............ | H04W 36/0094 |
| 2006/0292990 A1* | 12/2006 | Karabinis | ............ | H01Q 3/2611 |
| | | | | 455/63.4 |
| 2008/0101311 A1* | 5/2008 | Bernhard | ............... | H04W 36/24 |
| | | | | 370/342 |
| 2008/0102834 A1* | 5/2008 | Bernhard | ............... | H04W 36/24 |
| | | | | 455/436 |
| 2013/0150054 A1* | 6/2013 | Axmon | ................. | H04W 36/32 |
| | | | | 455/440 |
| 2013/0189991 A1* | 7/2013 | Rose | .................... | H04W 16/18 |
| | | | | 455/436 |
| 2014/0348014 A1* | 11/2014 | Teshima | ................ | H04W 24/10 |
| | | | | 370/252 |
| 2015/0038140 A1* | 2/2015 | Kilpatrick, II | ........ | H04W 64/00 |
| | | | | 455/436 |
| 2015/0085745 A1* | 3/2015 | Atreya | .................. | H04W 16/18 |
| | | | | 370/328 |
| 2015/0119036 A1* | 4/2015 | Yang | ................. | H04W 36/0094 |
| | | | | 455/436 |
| 2015/0296423 A1* | 10/2015 | Zhang | ............... | H04W 36/0022 |
| | | | | 455/436 |
| 2015/0373687 A1* | 12/2015 | Callard | ................... | H04L 67/34 |
| | | | | 370/329 |
| 2016/0072564 A1* | 3/2016 | Li | ......................... | H04L 5/0025 |
| | | | | 370/329 |
| 2016/0150445 A1* | 5/2016 | Sandhu | ............... | H04W 36/0094 |
| | | | | 370/331 |
| 2017/0055162 A1* | 2/2017 | Takano | ................. | H04W 16/28 |
| 2017/0311180 A1* | 10/2017 | Jalden | ................. | H04B 7/0617 |

FOREIGN PATENT DOCUMENTS

| | | |
|---|---|---|
| WO | 2012016598 A1 | 2/2012 |
| WO | 2014163553 A1 | 10/2014 |
| WO | 2016055092 A1 | 4/2016 |
| WO | 2016096001 A1 | 6/2016 |

* cited by examiner

INITIATING BLIND HANDOVER

CROSS REFERENCE TO RELATED APPLICATION(S)

This application is a 35 U.S.C. § 371 National Stage of International Patent Application No. PCT/EP2015/055551, filed Mar. 17, 2015, designating the United States, the disclosure of which is incorporated by reference.

TECHNICAL FIELD

The technology disclosed herein relates generally to the field of wireless communications and in particular to handover of terminals in wireless communications systems.

BACKGROUND

Advanced antenna systems may be used to enhance performance of wireless communications systems in uplink (UL) as well as in downlink (DL). One way to accomplish this performance enhancement is to use beamforming. Beamforming enables a radiation pattern of the advanced antenna system to be controlled by transmitting a signal from a plurality of antenna elements using a gain and phase specific for the individual antenna elements. In this way, radiation patterns with different pointing directions and beam widths in both elevation and azimuth directions may be created.

In wireless communications systems such as High Speed Packet Access (HSPA) and Long Term Evolution (LTE), common reference signals are transmitted (Common Pilot Channel, CPICH, and Cell Specific Reference Signal, CRS, respectively). These signals are measured by terminals (denoted user equipment, UE, in case of LTE) for instance for selecting a network node to communicate with, and as demodulation reference signals for data to be received by terminals served by the network node. Often, the area where a specific cell specific reference signal is received with highest power (as compared to cell specific reference signals transmitted from other network nodes) is referred to as a cell, and changing of beamforming patterns of the cell specific reference signal may therefore be referred to as "cell shaping".

This modification of cell uptake areas, i.e. the cell shaping, may for instance be done in order to distribute terminals between the cells more evenly (load balancing in the network nodes), which in turn may optimize coverage and/or capacity in the wireless communications system. The cell shaping in a wireless communications system may be automatically adjusted by employing a reconfigurable antenna system and a self-organizing network (RAS-SON) algorithm that adjusts the cell shapes based on some given network measurements and target performance metric.

Blind handover is an existing feature in which the network node, e.g. an evolved NodeB (eNodeB, or also denoted eNB) in case of LTE, may initiate a handover procedure for a terminal without doing conventional measurement configuration and without considering measurement reports. This feature may be beneficial when a fast handover is needed and candidate cell measurements are unavailable, or would impose an unwanted delay. Using the blind handover in such case removes the time and signaling needed to conduct handover measurements, hence giving the desired fast handover.

SUMMARY

However, for blind handovers to work it is assumed that coverage areas of source and target cells are overlapping to a large extent, since the knowledge of the radio conditions of the terminal is limited. If the coverage areas are overlapping to a large extent, then the chances are good that the terminal is able to communicate with the target cell. In case of utilizing a RAS-SON algorithm to individually tune frequency bands (frequency layers) and/or RAT coverage areas, it may be that this coverage overlap does not exist and cannot be assumed. Utilizing the blind handover feature together with RAS-SON functionality would then result in an increased fraction of dropped calls and hence dissatisfied users.

There is a need for solutions enabling the simultaneous use of the cell shaping and blind handover features.

An objective of the present disclosure is to solve or at least alleviate at least the above mentioned problem.

The objective is according to a first aspect achieved by a method for initiating a blind handover of a terminal in a wireless communications system. The terminal is served by a first cell using a first frequency band and a first radio access technology. The wireless communications system employs a method for dynamically changing coverage in at least one of the first cell and a second cell. The method comprises estimating the coverage in the second cell, wherein at least one of a second frequency band and a second radio access technology of the second cell may differ from the first frequency band and the first radio access technology; and initiating the blind handover for the terminal to the second cell only if the estimated coverage in the second cell meets a criterion.

The method enables simultaneous use of both automated RAS-SON algorithms and blind handover while maintaining the gains obtained from blind handover, such as e.g. fast handover in case of need for load balancing.

The objective is according to a second aspect achieved by a computer program for a wireless communications system for initiating a blind handover of a terminal. The computer program comprises computer program code, which, when executed on at least one processor of the wireless communications system causes the wireless communications system to perform the method as above.

The objective is according to a third aspect achieved by a computer program product comprising a computer program as above and a computer readable means on which the computer program is stored.

The objective is according to a fourth aspect achieved by a wireless communications system for initiating a blind handover of a terminal. The terminal is served by a first cell using a first frequency band and a first radio access technology, and the wireless communications system employs a method for dynamically changing coverage in at least one of the first cell and a second cell. The wireless communications system is configured to estimate the coverage in the second cell, wherein at least one of a second frequency band and a second radio access technology of the second cell may differ from the first frequency band and the first radio access technology, and initiate the blind handover for the terminal to the second cell only if the estimated coverage in the second cell meets a criterion.

Further features and advantages of the present disclosure will become clear upon reading the following description and the accompanying drawings.

DETAILED DESCRIPTION

Figure 1:
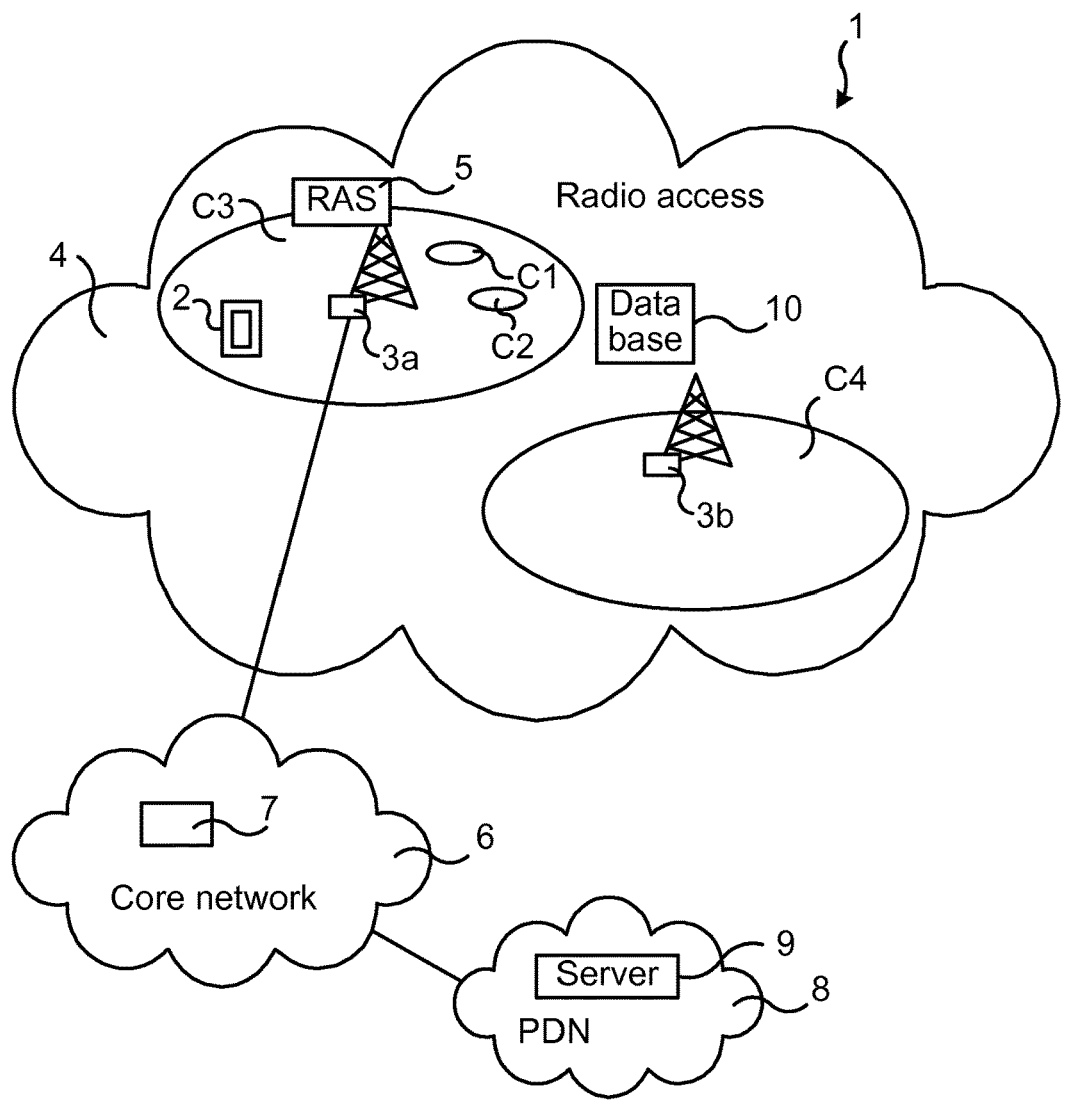
FIG. 1 illustrates schematically an environment in which embodiments of the present teachings may be implemented.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

FIG. 1 illustrates schematically an environment in which embodiments of the present teachings may be implemented. A wireless communications system 1 comprises a radio access network 4 and a core network 6.

The radio access network 4 (RAN) provides wireless communications for terminals 2 residing within its coverage area. The radio access network 4 comprises a number of network nodes 3a, 3b, e.g. denoted evolved NodeB (eNB) in case of LTE, communicating with the terminals (MTs) 2 over a wireless interface, e.g. evolved Universal Mobile Telecommunications System (UMTS) Terrestrial Radio Access (e-UTRA) in case of LTE. Each such network node 3a, 3b covers one or more geographical areas, denoted cells (or sometimes sectors), within which the wireless communication is provided to terminals 2 residing in such cell. For instance, a first network node 3a may provide coverage in three cells: a first cell C1, a second cell C2 and a third cell C3, while a second network node 3b may provide coverage in a single cell C4. The cells C1, C2, C3, C4 may, but need not, overlap partly or entirely; in FIG. 1 the third cell C3 is illustrated as entirely overlapping both the first cell C1 and the second cell C2, while the first cell C1 and the second cell C2 does not overlap each other at all. As a note of vocabulary, a cell to which a terminal 2 is handed over may be denoted target cell, while the cell that is currently serving the terminal 2 and from which the terminal 2 is handed off may be denoted source cell. Further, in exemplary embodiments of the present teachings, source cell is often denoted first cell, while target cell is denoted second cell.

The network nodes 3a, 3b may be denoted in different ways, e.g. base stations, access points, radio access nodes etc. Similarly, the terminals 2 may also be denoted in different ways, typically depending on the radio access technology (RAT) implemented in the wireless communications system 1. The terminals 2 may for instance be denoted wireless device, mobile station, mobile terminal, user equipment (UE) etc., and may e.g. comprise a smart phone, a tablet computer etc. In the description these denotations may be used interchangeably.

The network node 3a, 3b may comprise an advanced antenna system 5, e.g. a reconfigurable antenna system (RAS). The antenna system 5 may be configured to provide cells of different sizes, and may comprise algorithms for cell-shaping. The antenna system 5 may for instance comprise antenna arrays with at least two spatially separated antenna elements, and it is, in some embodiments, possible to measure the received signal on each such antenna element separately. Beamforming algorithms and means may also be provided in the network node 3a, 3b.

The wireless communications system 1 may further comprise one or more databases, as is described later. In FIG. 1, one such database 10 is illustrated as included in the radio access network 4. The database 10 may for instance be arranged in relation to the network node 3a, 3b or be an integrated part thereof. In other embodiments, the database 10 is located at a centralized location and accessible by several network nodes 3a, 3b.

The core network 6 comprises one or more core network nodes 7, e.g. Mobility Management Entity (MME) and serving gateway (SGW) and packet data network gateway (PDN-GW). Such core network nodes are collectively referred to by reference numeral 7. The core network 6 may, and typically does provide the terminals 2 connectivity to an external packet data network (PDN) 8, comprising a server 9, a cluster of servers, databases and/or other entities. The external PDN 8 may for instance comprise the Internet.

In the following, some more details on the RAS-SON and blind handover are given in order to provide a thorough understanding of the present teachings.

As mentioned, the cell shaping in a wireless communications system 1, and in particular the radio access networks 4 thereof, may be automatically adjusted by employing a RAS-SON algorithm that adjusts the cell shapes based on some given network measurements and target performance metric. Conceivable network measurements comprise, but are not limited to, using various antenna settings, e.g. antenna tilt, antenna lobe width etc., while optimizing a performance metric such as for instance coverage (which can be translated to received power), cell edge user throughput and capacity towards a target performance metric. Currently there exist a few automatic solutions that tunes the tilt setting based on some radio access network 4 measurements. It is reasonable to believe that similar solutions, that alter lobe widths and azimuth steering as well, will become more common, as radio access networks 4 become denser and offline network planning in complex environments becomes too difficult. Automatic cell shaping solutions, sometimes termed RAS-SON algorithms or RAS-SON features, will ease deployment and maintenance of cellular radio access networks 4. Moreover, in case of a site installation (e.g. an eNodeB), which is able to utilize more than a single frequency band and/or supporting more than a single RAT, it may be envisioned that an increased network performance may be obtained by having different cell coverages on separate frequency bands and/or different RATs. Such site installation may benefit from RAS-SON automatically tuning its cells in view of coverage, capacity and performance.

For blind handover, a coverage relation is currently assumed to exist and is preconfigured in the network nodes 3a, 3b. In particular, it is assumed that a network node 3a, 3b using e.g. two frequency bands provides the same coverage for both frequency bands. Correspondingly, in a network node 3a, 3b that can use either one of e.g. two different RATs it is assumed that both RATs provide the same coverage.

Figure 2:
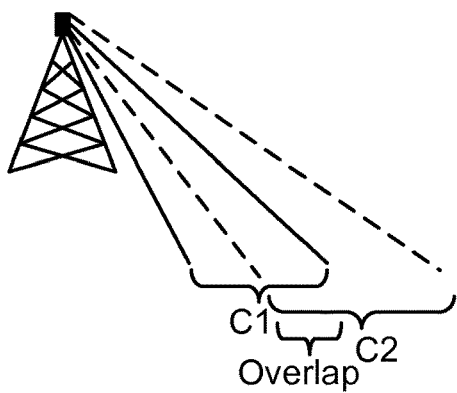
FIG. 2 illustrates a cell-shaping scenario.

FIG. 2 illustrates an example where the use of cell-shaping may be beneficial. A first cell C1 may use a first frequency band and a second cell C2 may use a second frequency band. In addition the first cell C1 may use a first RAT and the second cell C2 may use a second RAT. There may be an area in which these cells C1, C2 overlap, indicated in the figure as "overlap". As a particular example, the first cell C1 may be a heavily loaded cell, while the second cell C2 is a low loaded cell. In such situation cell shaping may be beneficial. For instance, the respective size of the first and second cells C1, C2 may be modified so that the number of terminals 2 in the first cell C1 (being heavily loaded) is reduced, i.e. the size of the first cell C1 may be reduced (the cell-shaping hence reducing the cell size). At the same time the size of the second cell C2 (having low load) may be increased, providing the terminals 2 that no longer reside within the first cell C1 with coverage. Such load balancing of terminals 2 may increase e.g. the downlink capacity for the terminals in the first cell C1.

In the blind handover the terminal 2 is handed over from a first cell (source cell) to a second cell (target cell). Both cells may be controlled by a single network node, or the cells may be controlled by different network nodes. The mentioned blind handover of a terminal 2 may, for instance, take place between cells in which different frequency bands and/or RAT's are used. As mentioned, the first cell may for instance use a first frequency band and the second cell a second frequency band. If the blind handover is done between different frequency bands, it may be denoted as inter-frequency blind handover. The inter-frequency handover from a first frequency band to a second frequency band may be needed e.g. when the quality of a connection using the first frequency band becomes very poor or for load balancing reasons. If the blind handover is between cells employing different RATs, it may be denoted an inter-RAT blind handover. The inter-RAT blind handover may for instance be needed because the current RAT has limited coverage at the particular location of the terminal 2. It is noted that the blind handover may involve both frequency band change as well as RAT change. In other instances, the blind handover is performed between cells having same frequency band as well as same RAT.

As mentioned, the blind handover feature may be beneficial when a fast handover is needed, e.g. if the network node 3a, 3b that is serving the terminal 2 is highly loaded and for which a load balancing would be advantageous. The blind handover feature may also be used when candidate cell measurements are unavailable or if candidate cell measurements would impose an unwanted delay. This could happen e.g. since the terminals 2, at a conventional handover, are configured to send measurement reports only when certain configured criteria are met, e.g. received signal strength from source cell falling below a threshold. For a terminal for which the received signal strength changes fast, it may then happen that (up to date) cell measurements are unavailable. Using the blind handover in such case removes the time and signaling needed to conduct handover measurements.

Briefly, one basic concept of the present teachings is to estimate the coverage of a given cell on a certain RAT or frequency band before considering a blind handover to that cell, and therefore only proceed with the blind handover when it is established that a sufficient coverage is available in the target cell. In case of an uncertainty of coverage, or when there is a known lack of coverage, a conventional measurement based handover may be performed instead.

The present teachings discloses methods and means for improving or at least maintaining gains of blind handover when used in combination with RAS-SON algorithms that optimizes coverage, capacity and/or performance on separate frequency bands or RATs independently, e.g. by cell shaping. This may, in various embodiments, be achieved by using spatial channel characteristics to estimate the received power at the terminal 2 for the new target frequency band and/or RAT. In a sense, it makes the blind handover non-blind.

A decision ground for this may be based on estimated received power in the terminal 2 (also denoted received terminal power in the following) for the target frequency band or target RAT to which handover is considered. The estimation of the received terminal power may be performed by utilizing available spatial measurement information, such as e.g. covariance matrix and given applied cell shapes for the given target frequency band/RAT.

In some embodiments, spatial channel information for terminal locations may be stored in a database 10. That is, for numerous geographical terminal locations, corresponding spatial channel information may be stored when obtained. A coverage map may be created based on the data of the database 10 and be used as basis for the blind handover decision. Such spatial channel information for terminal locations may be very valuable to the RAS-SON algorithm and is not unlikely to be available in the future.

In other embodiments, such estimation of received terminal power may be performed based on instantaneous uplink channel information or uplink measurements (reciprocity based) on the currently used frequency band that is then translated in frequency to the target frequency band and/or target RAT.

As mentioned earlier, beamforming is the transmitting of the same signal from a plurality of antenna elements with an antenna element specific gain and phase. The power and phase relation between the different antenna elements determine the sought beam/cell shape. With knowledge of the spatial characteristics of the channels as well as a given beamforming vector, an estimate of the received power at the terminal 2 in the target cell may be determined.

As mentioned, blind handover is a feature that allows for a non-measurement based handover of a terminal 2 from a first cell (source cell) to a second cell (target cell), for instance handover of the terminal 2 to a target cell on a different frequency band or RAT than the source cell. This in turn assumes that the coverage of the source cell and target cell on separate bands and/or RATs are very similar, or that it is known that the frequency band or RAT to which the terminal 2 is to be handed over have overlapping and/or larger coverage area than the currently serving cell. Otherwise, a terminal 2 may be handed over to e.g. a target cell that does not have service coverage for the given terminal 2 location, which in turn might result in dropping the connection to that user.

Future RAS-SON algorithms may be designed to automatically tune cell coverage based on some input metric in order to improve the network performance. In such cases it may very well be such that the optimal performance is obtained when there is uneven coverage between separate frequency bands and RAT's, i.e. the today assumed static coverage relation is not valid. In scenarios where the coverage changes dynamically, it is not really feasible to perform the blind handover based on preconfigured coverage relations between cells, and may lead to dropped calls/sessions. Having knowledge at the network node 3a, 3b about the actual coverage for different frequency bands and/or different RATs, without terminal's 2 having to measure and report on all, as provided by the present teachings, would allow for using blind handovers only when it is likely to be beneficial. Further, there is no need for pre-configuring any static coverage relations.

According to the present teachings, spatial channel characteristics between terminals 2 and several network nodes 3a, 3b may be established. This establishing may be performed by calculations or by retrieving the spatial channel characteristics from e.g. a database to if such spatial channel characteristics already exist.

Establishing the spatial channel characteristics may for instance be done on uplink, using channel reciprocity. That is, in the absence of terminal 2 feedback on the downlink, spatial channel characteristics derived from uplink signals may be used, assuming reciprocity of downlink and uplink, i.e. assuming that the uplink and downlink spatial channel characteristics are similar, or by translating the uplink characteristics to downlink characteristics in the spectral domain. Alternatively, the establishing of spatial channel characteristics may be done during a measurement phase, where the terminal reports downlink measurements made. As another example, e.g. one or several base stations may perform a specific measurement phase of a specified duration, during which the one or several base stations measures signals from several terminals for establishing spatial channel characteristics. Such spatial channel characteristics for terminals at different locations may then be used for creating a database comprising coverage maps. Several base stations could measure on signals from a same set of terminals.

Given the spatial channel characteristics of the current channel, the estimated received power at the terminal 2 for a different frequency band or RAT may be derived, examples of which are given later. Given that a handover is needed, e.g. due to load balancing need, and given that terminal 2 measurement reports are missing, a blind handover may still be allowed if the estimated received power at the terminal 2 location is sufficient from/to the target cell (e.g. on a new frequency band) for the currently ongoing service. This would thus make the blind handover only semi-blind in a sense.

The spatial channel characteristics may be determined in many different ways, which may affect the functionality and speed of the blind handover decision. On a high level three categories may be defined:
1. Instantaneous measurements (based on uplink measurements on current frequency band)
2. Measurements stored in a distributed manner (measurements of spatial characteristics from a single site location)
3. Measurements stored in a centralized manner (information of coverage possibilities from more than one site exists)

Depending on the type of data that is available, different levels of blind handover may be considered. In order to provide thorough understanding of the present teachings, the above three categories will be explained in more detail in the following. It is noted that the features described may also be combined in different ways.

1. Instantaneous Measurements

In some embodiments using instantaneous measurements, no database storage is required for the results. Given some link quality metric, for instance Reference Signal Received Power (RSRP) measurements in the current cell (current frequency band/RAT) together with channel estimates measured on the uplink and normalized with respect to an uplink beamformer (relying on reciprocity of the channel) as well as a cell-shaping vector used on the target frequency band an estimate of the received terminal 2 power may be established. In case that the frequency separation between the uplink at the current link and the downlink at the considered target frequency band is large the spatial channel information may need to be transformed (or translated). There are several known uplink to downlink frequency transformation methods that may be used, the majority of which are based on knowledge of the antenna array geometry and assumptions on the propagation environment. There are for instance methods based on uplink to downlink spatial covariance matrix transformation, or based on estimating channel covariance from uplink received signal power for downlink transmit precoding in Multiple Input Multiple Output (MIMO) frequency division duplex (FDD).

The selection of transformation method to use may for instance depend on what type of spatial channel data is considered. By relating the downlink estimated received terminal power with the power needed for service coverage on the new frequency band, it may be deduced if a handover is possible. Such a handover assumes that the network node 3a, 3b transmit locations (also denoted antenna locations) for the source and target frequency band are identical or at least very closely located. This would in particular be advantageous to implement on a multi frequency band/multi RAT installation.

It is noted that network node transmit locations may indeed often be identical or closely related, e.g. in that a "transmit location" may comprise a set of antenna elements or an antenna, which are often arranged on the same cell tower.

Although well-known it may, for sake of completeness of description, be mentioned that the uplink beamformer and/or the cell-shaping vector is a complex-valued vector describing phase and amplitude of each individual antenna element. The relations between all these values of the vector give the effective radiation pattern for the array antenna.

2. Stored Distributed

This case is somewhat similar to the previous case. A difference is that measurements, made in uplink and/or downlink, may be stored in a local database 10 (for example at the network node 3a, 3b site). This allows for more statistics to be gathered which may thus give a more accurate, reliable and also quicker decision on if coverage is available on the new frequency band/RAT that is being considered as handover candidate frequency band/RAT.

This may in some embodiments further be complemented with results on the success of previous handovers with similar channel characteristics. That is, a low handover success rate for earlier similar handovers would discourage from taking a handover decision in a current case, while a high handover success rate would encourage the handover decision.

Further, spatial channel measurements for certain terminal locations may be available on the different RAT's/ frequency bands which may remove the necessity to do a frequency transformation (or frequency translation). In line with what has been previously described, the stored distribution also assumes that the network node 3a, 3b transmit locations are identical (or closely located). The term closely located refers to site locations not being spatially separated such that the observed spatial characteristics at the site would differ to large extent from the spatial characteristics of the current terminal 2. This would in particular be suitable to be implemented in a multi band/multi RAT installation.

3. Stored Centralized

A difference between centralized storage (or centralized availability of data) and the above distributed storage (or distributed availability of data) is that since the database is centralized one terminal location may have measurements to/from several site locations. This means that the blind handover may be performed to another frequency band/RAT of a site whose antenna locations are not collocated at the network node 3a, 3b from which the handover is performed. This would for example allow for handover from a first network node, e.g. a macro eNB, to a second network node, e.g. a micro eNB even without measurement reports if the terminal 2 needs a more demanding service than the macro eNB can supply, given that the terminal 2 is in coverage of the micro eNB.

It may be envisioned that future systems comprise databases comprising such measurements and which are used for instance for guaranteeing and/or maintaining service coverage when doing cell shaping optimizations or when considering rapid network healing. In such scenarios, all knowledge needed for the blind handover feature to work together with a RAS-SON algorithm is already available.

Spatial Channel Characteristics/Information

The term "spatial channel characteristic" denotes a measurement or estimate of how the signal strength and signal phase of a link between a terminal 2 and a cell (or network node 3a, 3b providing the cell) varies as a function of antenna element position or as a function of a group of antenna element positions within an antenna array. A number of different such spatial channel characteristic measurements are known. In the following, some examples are given:

1. Direct channel estimate, h
2. Correlation/covariance matrix, $R=E\{h^H*h\}$, wherein R is the correlation/covariance matrix, H is the Hermitian transpose and h is the transmitted signal vector
3. Direction of arrival/departure estimates, typically estimated from h or R using various model-based or sub-space-based methods such as Root-Music, or estimation of signal parameters via rotational invariant techniques (ESPRIT).
4. Signal strength estimates for a set of different excitations vectors w_1 ... w_N, e.g. the estimate $S_j=w_j H*h$, H and h as before.

Coverage Prediction

A coverage prediction for a specific cell-to-terminal link when considering a hypothetical candidate set of cell shapes can be formed by considering the combined effect of the spatial channel characteristics and the hypothetical radiation pattern of the antenna. Considering for example the spatial channel information to be the correlation matrix, R, the signal strength in terms of the RSRP (Reference Signal Received Power) that the terminal will experience can be estimated as:

$$\widehat{RSRP} = \frac{RSRP_{MT} * w_{target}^H * R * w_{target}}{w_{source}^H * R * w_{source}} \quad (Eq\ 1)$$

Here, the term $\widehat{RSRP}$ thus is the estimated signal strength in terms of RSRP. Further, $RSRP_{MT}$ is the measured RSRP value, $w_{target}$ is the considered weight vector used over the elements in the network node antenna array for the target band and/or RAT (thereby forming the radiation pattern/cell shape), R is the spatial correlation matrix, and $w_{source}$ is the weight vector for which the RSRP value was measured (received beamformer).

Other embodiments are also contemplated, e.g. considering the angles of arrival/departure $(\theta,\varphi)$ in relation to a hypothetical radiation pattern $G(\theta,\varphi)$ and deriving an estimate of the antenna gain that the terminal 2 will experience at its current location.

Figure 3:
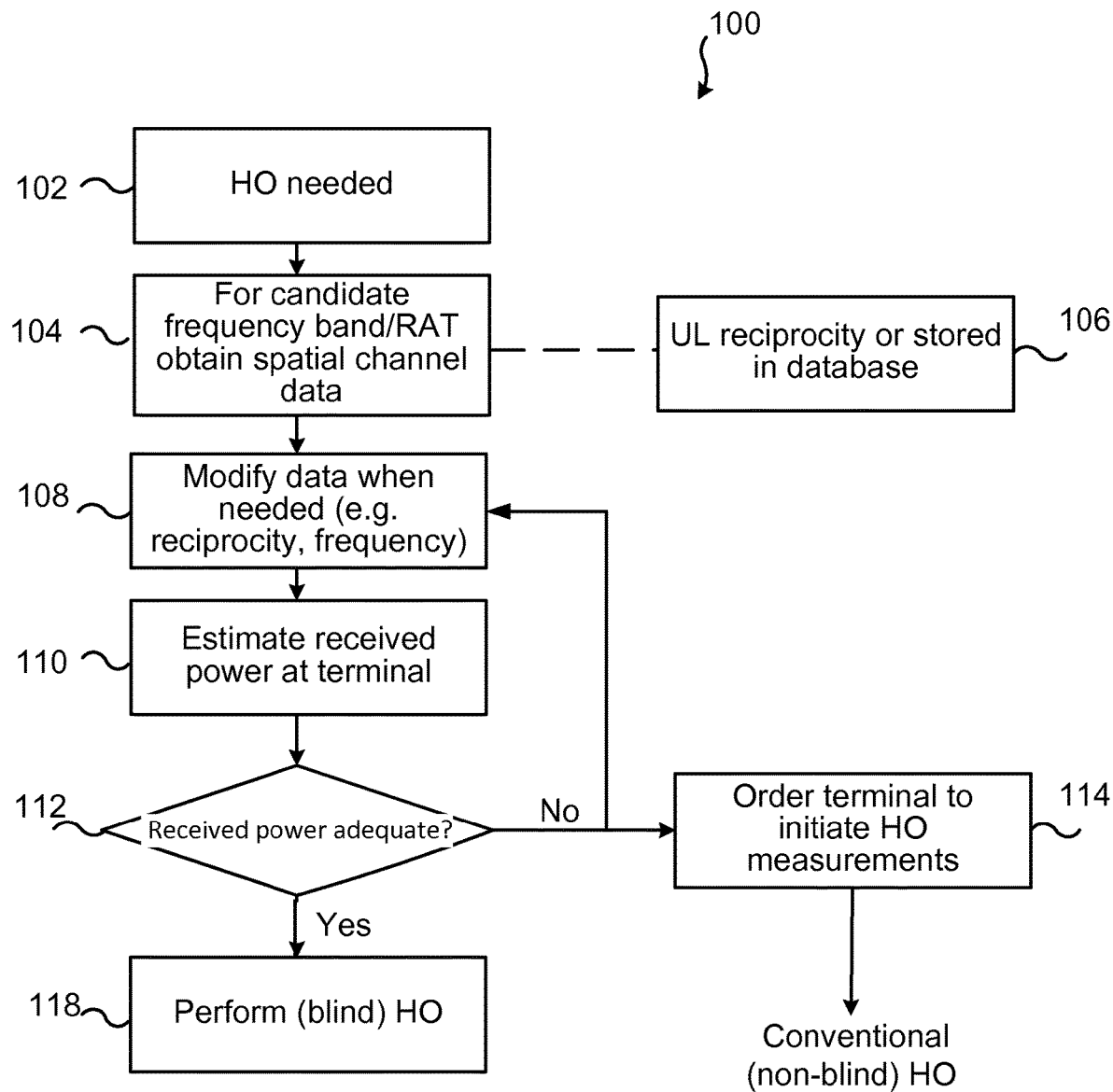
FIG. 3 illustrates a flow chart over steps of a method in a network in accordance with an embodiment.

FIG. 3 illustrates a flow chart over steps of a method 100 in a network in accordance with an embodiment. In particular, FIG. 3 illustrates how a handover decision can be made based on the present teachings.

The flow starts in box 102, wherein it is established that a handover (HO) is needed. This may be due to e.g. overload situation in a network node 3a, 3b, or that a certain frequency band experiences reduced coverage.

The flow continues to box 104, wherein spatial channel data is obtained for candidate target cells, possibly using different frequency band and/or RATs. The spatial channel data may for instance be obtained from a database or be based on instantaneous uplink measurements, as explained earlier. Box 106 exemplifies this, i.e. that uplink (UL) reciprocity may for instance be used (assumed) or that databases may be used.

In box 108 the data may, if needed, be modified. For instance, if estimation of received terminal power is performed based on instantaneous uplink channel information or uplink measurements, i.e. the estimation is reciprocity based, on the currently used frequency band, the data may need to be modified, e.g. translated in frequency to the target candidate cells. Stated differently, if there is a large difference in frequency, the covariance matrix may differ for the frequencies and need to be adapted accordingly to provide sufficiently accurate estimates.

In box 110, a link quality metric, such as received power, is estimated at the terminal at its current location and for the candidate target cells. In case of the link quality metric being the received power at the terminal, the equation (Eq 1), may be used. This estimate is based on data that has possibly been modified in box 108. The candidate target cells may be ranked according to e.g. received power and the best candidate target cell eventually be selected.

In box 112 it is determined if the estimated link quality metric, exemplified in the flow chart by received power, is adequate e.g. for providing an ongoing service. If the outcome of the determination is "No", then flow may continue to box 114, wherein the terminal 2 may instead be ordered to initiate handover measurements. This would then result in a conventional handover. In other embodiments and instances, flow may continue back to box 108, and further to box 110, and new candidate cells be evaluated in box 112. This may be repeated for all available candidate target cells.

If, on the other hand, the outcome of the determination of box 112 is "Yes", then flow continues to box 118, wherein the blind handover is made.

Figure 4:
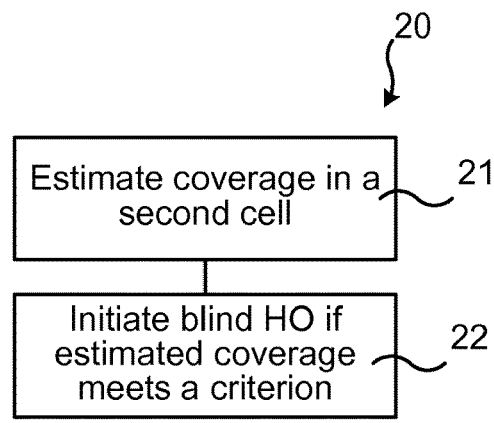
FIG. 4 illustrates a flow chart over steps of a method in a network in accordance with an embodiment.

The various embodiments and features that have been described may be combined in different ways, examples of which are provided next, with reference first to FIG. 4.

FIG. 4 illustrates a flow chart over steps of a method in a wireless communications system in accordance with an embodiment. A method 20 for initiating a blind handover of a terminal 2 is provided. The method 20 may be performed in a wireless communications system 1, e.g. as described with reference to FIG. 1. The terminal 2 is served by a first cell using a first frequency band and a first radio access technology and the wireless communications system 1 employs a method for dynamically changing coverage in at least one of the first cell and a second cell. Examples of such methods comprise any RAS-SON algorithm. In some scenarios the first cell (source cell or serving cell) has a dynamically changing coverage while the second cell (target cell) has a fixed coverage. In other scenarios, both cells have dynamically changing coverages and in still other scenarios, the first cell has a fixed coverage while the second has a dynamically changing coverage. If any one or both of the first and second cell changes dynamically, then the overlap, if any, between the cells may become unknown.

The method 20 comprises estimating 21 the coverage in the second cell. One or more of a second frequency band and a second radio access technology of the second cell may differ from the first frequency band and the first radio access technology. The estimation of the coverage in the second cell is made in order to ensure that there is coverage in the second cell before the terminal 2 is handed over to this second cell. The coverage of the second cell may typically differ from the coverage of the first cell in case the frequency bands and/or RATs of the first and second cells are different.

The frequency band of the first cell may differ from the frequency band of the second cell, i.e. the first frequency band may differ from the second frequency band, and the terminal 2 may hence need to perform an inter-frequency handover. In other instances, the first frequency band is the same as the second frequency band and the terminal 2 may perform an intra-frequency handover. In still other instances, the radio access technology used in the first cell may differ from the radio access technology used in the second cell, i.e. the first radio access technology may differ from the second radio access technology.

The method 20 comprises initiating 22 the blind handover for the terminal 2 to the second cell only if the estimated coverage in the second cell meets a criterion. This criterion may for instance comprise an estimated link quality metric, such as the received power at the terminal 2.

The method 20 may be implemented and performed in a single node of the wireless communications system 1. In other embodiments, the method 20 may be implemented in a distributed fashion, e.g. wherein the estimating 21 is performed in in a first node and the initiating is performed in a second node (e.g. base station).

The method 20 allows both automated cell-shaping methods, e.g. RAS-SON algorithms, and blind handover to be used while maintaining gains from blind handover. Further, the gain of blind handover is increased since knowledge of coverage is obtained before actually performing any handover. The blind handover is thus given some information, hence not being completely blind.

Further still, any pre-configuration of cell coverage overlap information may be avoided, which pre-configuration would impose limitations on functions like RAS-SON.

In an embodiment, the estimating 21 the coverage in the second cell comprises estimating a link quality metric at the terminal 2 in the second cell. As mentioned, an example of such link quality metric comprises the estimated received power at the terminal 2, another example comprises evaluating if the second cell has enough resources available to server the terminal 2, thereby avoiding the second cell from becoming overloaded.

In a variation of the above embodiment, the estimating 21 comprises estimating a link quality metric, such as e.g. the received power, at the terminal 2 in the second cell by:
  establishing spatial channel information for a downlink transmission in the second cell, and
  estimating, based on the spatial channel information, a link quality metric (e.g. received power) of the terminal 2 in the second cell.

The establishing of spatial channel information may for instance comprise

In some embodiments, the link quality metric at the terminal (2) in the second cell is estimated by using:
  a spatial channel estimate in the first cell based on uplink measurements in the first cell on an uplink frequency band of the first cell, the spatial channel estimate being normalized with respect to an uplink beamformer used in the first cell, and
  a cell-shaping vector used in the second cell.

In a variation of the above embodiments, the method 20 comprises, for the case that the uplink frequency band in the first cell and a downlink frequency band in the second cell are different and separated by a set spectral distance, performing an uplink to downlink frequency transformation.

In various embodiments, the first cell and second cell are controlled by a first network node 3a and the link quality metric at the terminal 2 in the second cell is estimated based on (stored) spatial channel information established by the first network node 3a for one or more previous terminals at the approximate current location of the terminal 2.

In various embodiments, the link quality metric (e.g. received power) at the terminal 2 in the second cell is estimated based on (stored) spatial channel information previously established for one or more terminals at the approximate current location of the terminal 2 in relation to two or more network nodes 3a, 3b.

In an embodiment, the initiating 22 the blind handover comprises initiating the blind handover only if the estimated link quality metric meets a criterion.

In an embodiment, the estimating 21 the coverage in the second cell comprises using a coverage map, created based on spatial channel information for terminal locations in the second cell, and a weight vector used over antenna elements for downlink transmission of the second cell. Such coverage map may be created and/or updated continuously, or a coverage map stored in a database may be retrieved and used in the estimating 21 the coverage in the second cell.

In various embodiments, the method 20 comprises initiating a measurement based handover of the terminal 2 if the estimated coverage fails to meet the criterion. That is, if the estimated coverage in the second cell is insufficient, and the risk of handover failure thus being high, then a conventional handover can be made, that is based on measurements performed by the terminal.

Figure 5:
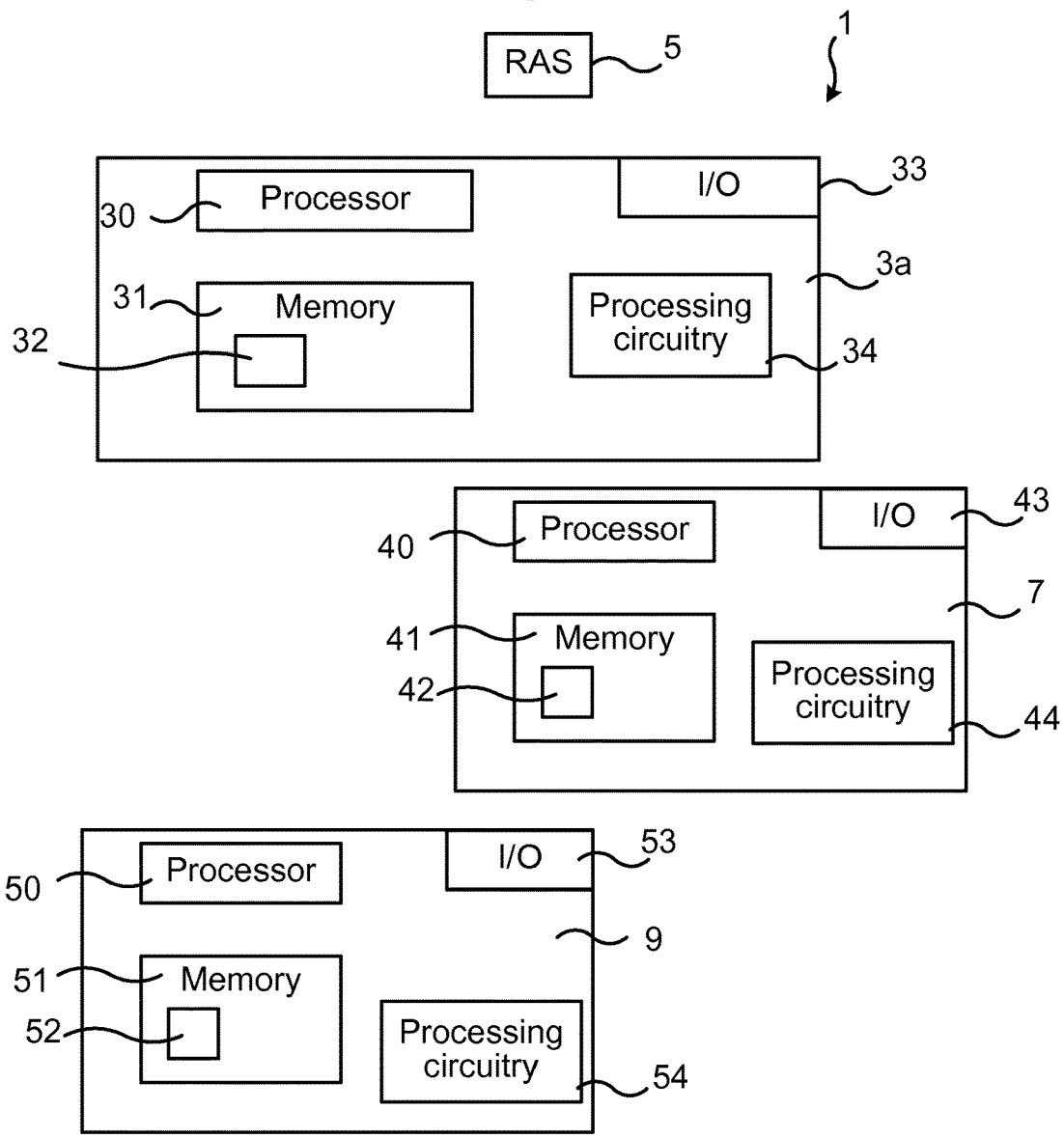
FIG. 5 illustrates schematically a network node and means for implementing embodiments.

FIG. 5 illustrates schematically a wireless communications system 1 and means for implementing embodiments according to the present teachings.

The various embodiments of the method 20 as described e.g. in relation to FIG. 4 may be implemented in a single network node, e.g. in the network nodes 3a, 3b. That is, the method 20 may be executed in a single network node. In other embodiments, the method 20 may be implemented in the wireless communications system 1 in a distributed fashion, wherein different functions/steps are performed by different devices or network nodes. As a particular example, some steps may be performed in the radio access node 3a, 3b while others are performed in a core network node 7 or in a server 9 of a cluster of servers (e.g. Internet).

The communication system 1 described with reference to FIG. 1 is illustrated in a more schematic way in FIG. 5. In FIG. 5, three network nodes are shown, in particular a network node 3a (e.g. a radio access node such as eNodeB), a core network node 7 and a server 9 of a packet data network. It is however noted that other, additional or fewer network nodes may be involved in executing the method 20.

Each of the network nodes 3a, 7, 9 or network devices illustrated in FIG. 5 comprises a respective processor 30, 40, 50. Each of the processors 30, 40, 50 may comprise any combination of one or more of a central processing unit (CPU), multiprocessor, microcontroller, digital signal processor (DSP), application specific integrated circuit etc. capable of executing software instructions stored in a respective memory 31, 41, 51 which can thus be a respective computer program product 31, 41, 51. The processors 30, 40, 50 can be configured to execute any of the various embodiments of the method for instance as described in relation to FIG. 3 or FIG. 4, or parts of the steps, i.e. wherein different steps of the method 20 are executed in different network nodes.

Each memory 31, 41, 51 can be any combination of read and write memory (RAM) and read only memory (ROM), Flash memory, magnetic tape, Compact Disc (CD)-ROM, digital versatile disc (DVD), Blu-ray disc etc. Each memory 31, 41, 51 may also comprise persistent storage, which, for example, can be any single one or combination of magnetic memory, optical memory, solid state memory or even remotely mounted memory.

Each network node 3a, 7, 9 may also comprise a respective input/output device 33, 43, 53 (indicated by I/O in the FIG. 5) for communicating with other network nodes and devices in the wireless communication system 1. Each of the input/output devices 33, 43, 53 may for instance comprise a communication interface. The input/output devices 33, 43, 53 may e.g. be adapted to communicate over a wired connection with other network node directly or via intermediate network nodes, and/or be adapted to communicate over wireless connections with terminals 2.

A wireless communications system 1 is provided for initiating a blind handover of a terminal 2. The terminal 2 is served by a first cell using a first frequency band and a first radio access technology, wherein the wireless communications system 1 employs a method for dynamically changing coverage in at least one of the first cell and a second cell. The wireless communications system 1 is configured to:
  estimate the coverage in the second cell, wherein at least one of a second frequency band and a second radio access technology of the second cell may differ from the first frequency band and the first radio access technology, and
  initiate the blind handover for the terminal 2 to the second cell only if the estimated coverage in the second cell meets a criterion.

The wireless communication system 1 may be configured to perform the above steps e.g. by comprising one or more processors 30, 40, 50 and one or more memories 31, 41, 51, the memories 31, 41, 51, each containing instructions executable by the processors 30, 40, 50, whereby the memories 31, 41, 51 are operative to perform the steps. In an embodiment, a single network node 3a is configured to perform the method 20, and the network node 3a may then be configured to perform the steps of the method 20 by means of a processor 30 and a memory 31 containing instructions executable by the processor 30, whereby the memory 31 is operative to perform the steps.

In an embodiment, the wireless communications system 1 is configured to estimate the coverage in the second cell by estimating a link quality metric at the terminal 2 in the second cell.

In an embodiment, the wireless communications system 1 is configured to estimate a link quality metric at the terminal 2 in the second cell by:
  establishing spatial channel information for a downlink transmission in the second cell, and
  estimating, based on the spatial channel information, a link quality metric of the terminal 2 in the second cell.

In an embodiment, the wireless communications system 1 is configured to estimate the link quality metric at the terminal 2 in the second cell by:
  a spatial channel estimate in the first cell based on uplink measurements in the first cell on an uplink frequency band of the first cell, the spatial channel estimate being normalized with respect to an uplink beamformer used in the first cell, and
  a cell-shaping vector used in the second cell.

In a variation of the above embodiment, the wireless communications system 1 is configured to, for the case that the uplink frequency band in the first cell and a downlink frequency band in the second cell are different and separated by a set spectral distance, perform an uplink to downlink frequency transformation.

In an embodiment, the wireless communications system 1 is configured to control the first cell and second cell by a first network node 3a and configured to estimate the link quality metric at the terminal 2 in the second cell based on spatial channel information established by the first network node 3a for one or more previous terminals at the approximate current location of the terminal 2.

In an embodiment, the wireless communications system 1 is configured to estimate the link quality metric at the terminal 2 in the second cell based on spatial channel information established for one or more previous terminals at the approximate current location of the terminal 2 in relation to two or more network nodes 3a, 3b.

In an embodiment, the wireless communications system 1 is configured to the initiate the blind handover comprises initiating the blind handover only if the estimated link quality metric meets a criterion.

In an embodiment, the wireless communications system 1 is configured to estimate the coverage in the second cell by using a coverage map, created based on spatial channel information for terminal locations in the second cell, and a weight vector used over antenna elements for downlink transmission of the second cell.

In an embodiment, the wireless communications system 1 is configured to initiate a measurement based handover of the terminal 2 if the estimated coverage fails to meet the criterion.

The present teachings also encompasses computer program products 31, 41, 51 comprising a computer program 32, 42, 52 for a communication system 1 and a computer readable means on which the computer program 42, 52, 52 is stored. Each computer program 32, 42, 52 comprises computer program code, which, when executed on at least one processor in the wireless communications system 1 causes the wireless communications system 1, or a network node 3a thereof, to perform the method 20 according to any of the described embodiments thereof.

The computer program products 32, 42, 52, or the memories, thus comprise instructions executable by a processor 30, 40, 50. Such instructions may be comprised in a computer program, or in one or more software modules or function modules.

Means are provided, e.g. function modules, that can be implemented using software instructions such as computer program executing in a processor and/or using hardware, such as application specific integrated circuits, field programmable gate arrays, discrete logical components etc., or any combination thereof. Such function modules are indicated schematically at reference numerals 34, 44, 54 in FIG. 5.

In particular, a wireless communication system is provided. The wireless communications system comprises first means for estimating the coverage in the second cell, wherein at least one of a second frequency band and a second radio access technology of the second cell may differ from a first frequency band and a first radio access technology of a first cell. Such first means may comprise processing circuitry adapted to estimate the coverage.

The wireless communications system comprises second means for initiating the blind handover for the terminal to the second cell only if the estimated coverage in the second cell meets a criterion. Such second means may comprise processing circuitry adapted for initiate the blind handover.

The wireless communications system 1 may comprise still further means for executing the various embodiments as described. For instance, the wireless communications system may comprise third means for estimating the coverage in the second cell by estimating a link quality metric, such as e.g. received power, at the terminal 2 in the second cell. Such third means may comprise processing circuitry adapted to estimate the coverage by estimating the link quality metric.

The wireless communications system 1 may comprise still further means for executing the various embodiments as described. For instance, the wireless communications system may comprise fourth means for the estimating a link quality metric at the terminal in the second cell by:
   establishing spatial channel information for a downlink transmission in the second cell, and
   estimating, based on the spatial channel information, a link quality metric of the terminal in the second cell.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method for initiating a blind handover of a first terminal in a wireless communications system, the first terminal being served by a first cell using a first frequency band and a first radio access technology, wherein the wireless communications system employs a method for dynamically changing coverage in at least one of the first cell and a second cell, the method comprising:
   estimating, based on at least one of information associated with the second cell or information associated with a location of the first terminal, a received power that the first terminal is expected to experience when being served by the second cell, wherein the estimating the received power that the first terminal is expected to experience when being served by the second cell comprises calculating the estimated received power using a spatial correlation matrix (R) and a measured received power value indicating a measured received power at the first terminal of a signal transmitted by the first cell;
   determining whether the estimated received power meets a criterion; and
   initiating the blind handover for the first terminal to the second cell as a result of determining that the estimated received power meets the criterion.

2. The method of claim 1, wherein the estimating the received power that the first terminal is expected to experience when being served by the second cell further comprises calculating an estimated reference signal received power value using as an input to a calculation of the measured received power value indicating the measured received power at the first terminal of the signal transmitted by the first cell.

3. The method of claim 1, wherein the estimating the received power further comprises:
   obtaining spatial channel information for a downlink transmission in the second cell, and
   estimating, based on the spatial channel information, the received power,
   wherein the obtained spatial channel information indicates how a signal strength of a link between the first terminal and a base station serving the second cell varies as a function of antenna element position within an antenna array.

4. The method of claim 1, wherein the received power at the first terminal in the second cell is estimated by using:
   a spatial channel estimate based on uplink measurements in the first cell on an uplink frequency band of the first cell, the spatial channel estimate being normalized with respect to an uplink beamformer used in the first cell, and
   a cell-shaping vector used in the second cell.

5. The method of claim 4, wherein:
   the uplink frequency band in the first cell and a downlink frequency band in the second cell are different and separated by a spectral distance, and
   the step of estimating the received power further comprises performing an uplink to downlink frequency transformation.

6. The method of claim 1, wherein the estimating the received power further comprises:
   determining an approximate current location of the first terminal;
   retrieving spatial channel information associated with the determined approximate current location of the first terminal; and
   estimating the received power based on the retrieved spatial channel information.

7. The method of claim 6, wherein the spatial channel information was generated based on information transmitted by a second terminal when the second terminal was positioned at the approximate current location of the first terminal.

8. The method of claim 1, wherein the estimating the received power that the first terminal is expected to experience when being served by the second cell comprises calculating an estimated reference signal received power value using as inputs to a calculation of i) the spatial correlation matrix and ii) the measured received power value indicating the measured received power at the first terminal of the signal transmitted by the first cell.

9. The method of claim 1, wherein the estimating the received power further comprises estimating the received power using a coverage map created based on spatial channel information for terminal locations in the second cell, and a weight vector used over antenna elements for downlink transmission of the second cell.

10. The method of claim 1, further comprising initiating a measurement based handover of the first terminal if the estimated received power fails to meet the criterion.

11. A computer program product comprising a non-transitory computer readable medium storing a computer program for the wireless communications system for initiating the blind handover of the first terminal, the computer program comprising computer program code, which, when executed on at least one processor of the wireless communications system causes the wireless communications system to perform the method of claim 1.

12. A wireless communications system for initiating a blind handover of a first terminal, the first terminal being served by a first cell using a first frequency band and a first radio access technology, wherein the wireless communications system employs a method for dynamically changing coverage in at least one of the first cell and a second cell, the wireless communications system being configured to:
   estimate, based on at least one of information associated with the second cell or information associated with a location of the first terminal, a received power that the first terminal is expected to experience when being served by the second cell, wherein the wireless communications system is configured to estimate the received power that the first terminal is expected to experience when being served by the second cell by calculating an estimated reference signal received power value using as inputs to a calculation of i) a spatial correlation matrix (R) and ii) a measured received power value indicating a measured received power at the first terminal of a signal transmitted by the first cell;

determine whether the estimated received power meets a criterion; and initiate the blind handover for the first terminal to the second cell as a result of determining that the estimated received power meets the criterion.

13. The wireless communications system of claim 12, wherein the wireless communications system is further configured to estimate the received power at the first terminal in the second cell by performing a process comprising:

obtaining spatial channel information for a downlink transmission in the second cell, and estimating, based on the spatial channel information, the received power, wherein the obtained spatial channel information indicates how a signal strength of a link between the first terminal and a base station serving the second cell varies as a function of antenna element position within an antenna array.

14. The wireless communications system of claim 12, wherein the wireless communications system is further configured to estimate the received power at the first terminal in the second cell using:

a spatial channel estimate based on uplink measurements in the first cell on an uplink frequency band of the first cell, the spatial channel estimate being normalized with respect to an uplink beamformer used in the first cell, and a cell-shaping vector used in the second cell.

15. The wireless communications system of claim 14, wherein:

the uplink frequency band in the first cell and a downlink frequency band in the second cell are different and separated by a spectral distance, and estimating the received power further comprises performing an uplink to downlink frequency transformation.

16. The wireless communications system of claim 12, wherein the wireless communications system is further configured to estimate the received power by performing a process that comprises:

determining an approximate current location of the first terminal;

retrieving spatial channel information associated with the determined approximate current location of the first terminal; and estimating the received power based on the retrieved spatial channel information.

17. The wireless communications system of claim 16, wherein the wireless communications system is configured to generate the spatial channel information based on information transmitted by a second terminal when the second terminal was positioned at the approximate current location of the first terminal.

18. The wireless communications system of claim 12, wherein the wireless communications system is further configured to use a coverage map to estimate the received power, wherein the coverage map is created based on spatial channel information for terminal locations in the second cell, and a weight vector used over antenna elements for downlink transmission of the second cell.

19. The wireless communications system of claim 12, wherein the wireless communications system is further configured to initiate a measurement based handover of the first terminal if the estimated received power fails to meet the criterion.

20. The method of claim 1, wherein the estimating the received power that the first terminal is expected to experience when being served by the second cell further comprises:

calculating the estimated received power using the spatial correlation matrix (R), the measured received power value indicating the received power at the first terminal of the signal transmitted by the first cell, a first weight vector (W1) associated with the first cell, and a second weight vector (W2) associated with the second cell.

21. The method of claim 1, wherein the estimating the received power that the first terminal is expected to experience when being served by the second cell further comprises:

calculating (RSRPmt*W1$^H$*R*W1)/(W2$^H$*R*W2), where R is the spatial correlation matrix, W1 is a first weight vector associated with the first cell, W2 is a second weight vector associated with the second cell, W1$^H$ is the Hermitian transpose of W1, W2$^H$ is the Hermitian transpose of W2, and RSRPmt is a measured reference signal received power (RSRP) value.

* * * * *